(12) United States Patent
Du et al.

(10) Patent No.: US 8,828,318 B2
(45) Date of Patent: Sep. 9, 2014

(54) HIGH-PRESSURE EXTRACTION APPARATUS AND METHOD

(75) Inventors: Tz-Bang Du, Yilan County (TW); Chyuan Juang, Hsinchu (TW); Long-Shuenn Jean, Chiayi County (TW); Chen-Hsi Cheng, Hsinchu (TW); Hom-Ti Lee, Hsinchu (TW); Hsien-Chueh Pi, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 386 days.

(21) Appl. No.: 13/217,098

(22) Filed: Aug. 24, 2011

(65) Prior Publication Data

US 2012/0283457 A1 Nov. 8, 2012

(30) Foreign Application Priority Data

May 4, 2011 (TW) .............................. 100115671 A (51) Int. Cl.
 *B01D 11/02* (2006.01)
(52) U.S. Cl.
 CPC ................... *B01D 11/0219* (2013.01)
 USPC ............ 422/62; 422/527; 422/261; 422/281; 422/295; 210/143
(58) Field of Classification Search
 USPC ........... 422/62, 527, 112, 232–234, 236, 261, 422/281, 295; 210/143, 148
 See application file for complete search history.

(56) References Cited

U.S. PATENT DOCUMENTS

| | | | |
|---|---|---|---|
| 2,427,446 A | 9/1947 | De La Roza, Sr. | |
| 5,169,968 A * | 12/1992 | Rice .............................. | 554/193 |
| 5,487,981 A | 1/1996 | Nivens et al. | |
| 5,939,571 A | 8/1999 | Foidl | |
| 7,648,635 B2 | 1/2010 | Seidlitz et al. | |
| 2005/0266132 A1 | 12/2005 | Temelli et al. | |
| 2008/0146851 A1 | 6/2008 | Schonemann et al. | |

FOREIGN PATENT DOCUMENTS

| | | |
|---|---|---|
| CN | 86106852 A | 4/1988 |
| CN | 2134990 Y | 6/1993 |
| CN | 1107675 C | 5/2003 |
| CN | 1448383 A | 10/2003 |
| CN | 1450214 A | 10/2003 |
| CN | 1639166 A | 7/2005 |
| CN | 1781572 A | 6/2006 |

(Continued)

OTHER PUBLICATIONS

Miguel A.M., Binary and Ternary Phase Behavior of alpha-Pinene, beta-Pinene, and Supercritical Ethene, J.Chem. Eng.Data, 1996, 41(5), pp. 1104-1110.

(Continued)

*Primary Examiner* — Jan Ludlow
(74) *Attorney, Agent, or Firm* — Morris Manning & Martin LLP; Tim Tingkang Xia, Esq.

(57) ABSTRACT

A high pressure extraction apparatus and extracting method therefor are adapted to maintain a medium at the supercritical state to extract substance-to-be-extracted. The apparatus includes an extraction tank, a piston and a control unit. The control unit controls the piston to reciprocate in the extraction tank as well as controls the pressure of the extract space of the tank, feeding of the substance, discharge of extract, and discharge of leftover. Accordingly, the apparatus performs a continuous supercritical extraction.

11 Claims, 9 Drawing Sheets

(56) References Cited

FOREIGN PATENT DOCUMENTS

| | | |
|---|---|---|
| CN | 201186169 Y | 1/2009 |
| CN | 101579584 A | 11/2009 |
| CN | 101608386 A | 12/2009 |
| JP | 04-094702 A | 3/1992 |
| JP | 6233901 A | 8/1994 |
| TW | I317771 B | 12/2009 |
| TW | I321065 B | 3/2010 |
| TW | 201122092 A1 | 7/2011 |
| TW | 99137647 | 5/2012 |
| TW | 100117418 | 12/2012 |

OTHER PUBLICATIONS

Robert M.Oag, et al., Determining phase boundaries and vapour/liquid critical points in supercritical fluids: a multi-technique approach, The Journal of Supercritical Fluids, 2004, V30(3), pp. 259-272.

Chen Bo-Hong, High-Pressure Phase Equilibrium for Carbon Dioxide-Isomeric Butanol Systems, Master's Thesis, 2002, National Cheng Kung University.

Walker T.H., et al., Supercritical Carbon Dioxide Extraction of Lipids from Pythium irregulare, JAOCS, 1999, vol. 76 (5), pp. 595-602.

Intellectual Property Office, Ministry of Economic Affairs, R.O.C., "Office Action", Jun. 21, 2013, Taiwan.

Rong-Fung Chaung et al., Measurements of Vapor-Liquid Phase Boundaries for the Mixtures Containing Supercritical Carbon Dioxide Antisolvent and Solvent with Synthetic Method, National Taiwan University of Science and Technology, Department of Chemical Engineering Theses and Dissertations, Jul. 27, 2005, p. 1-111, National Digital Library of Theses and Dissertations in Taiwan, Taiwan, R.O.C.

State Intellectual Property Office of the P.R.C., "Office Action", Apr. 9, 2014, China.

Chan-Hua Liao et al., Preliminary study of supercritical CO2 extraction technology and equipment, Petro-Chemical Equipment, Sep. 2002, pp. 32-34, vol. 31, No. 5, College of Mechanical Engineering , Nanjing University of Technology, Nanjing 210009, China.

\* cited by examiner

HIGH-PRESSURE EXTRACTION APPARATUS AND METHOD

CROSS-REFERENCE TO RELATED APPLICATIONS

This non-provisional application claims priority under 35 U.S.C. §119(a) on Patent Application No(s). 100115671 filed in Taiwan, R.O.C. on May 4, 2011, the entire contents of which are hereby incorporated by reference.

BACKGROUND

1. Field

The present disclosure relates to a high-pressure extraction apparatus, and more particularly to a continuous supercritical extraction apparatus.

2. Related Art

Supercritical fluid extraction technologies generally include steps of placing a substance-to-be-extracted in a chamber, filling the chamber with a medium until the medium reach the supercritical state, and then extracting the substance by the medium. The medium at the supercritical state exhibits high diffusibility as gas phase and strong solvent power as liquid phase. Generally, the method for enabling the medium to reach the supercritical state is to fill and pressurize the chamber with the medium, so as to increase the pressure in the chamber, till the pressure reaches a supercritical point of the medium.

Currently, a supercritical extraction apparatus is usually operated by batch. After each batch of extraction, the chamber is depressurized to the atmospheric pressure first, an extraction residue is discharged, and then a new batch of substance-to-be-extracted is fed into the chamber. According to the procedure, in each batch operation, pressurization and depressurization need to be performed. In addition, for a large scale chamber at the depressurization process, oil pressure device is needed to open a cover of the chamber. Those operations are very time-consuming. Further, the fed medium is exhausted and wasted as well as the pressure loss occurs during the depressurization. Upon this kind of supercritical extraction apparatus, a larger scale chamber will make the aforementioned problems worse.

In addition, some technologies propose continuous supercritical extraction technologies, for example, in U.S. Pat. No. 5,939,571 and Japanese Patent No. JP6233901A. U.S. Pat. No. 5,939,571 describes a device for the production of oils by pressing and extracting a raw material containing oleiferous or extractable substances in the presence of a liquid or supercritical extraction agent. The device includes an inlet for said raw material, a substantially cylindrical pressing body having outlets for oils and being connected to said inlet, and a press screw movably provided in said cylindrical pressing body whereby said raw material is transported from said inlet into said pressing body and therefrom to a discharge outlet while being pressed. In addition, the pressing body is proof-sealed against its surroundings by a jacket and the press screw and/or the pressing body include outlets wherethrough a liquid extraction agent may be introduced into said raw material present in said pressing body. At the outlet of said pressing body, a pipe permitting degassing of the press cake discharged from the press by applying a vacuum, thus removing the solvent from it, may be provided.

In Japanese Patent No. JP6233901A, the continuous feeding of a high pressure fluid is achieved through reciprocation of a hard bead in a check valve.

Additionally, a substance for extraction is usually a dry substance, a substance after drying, or a substance with a large particle size according to the present supercritical extraction technology. The reason is that a wet substance for extraction would causes liquid seal (blocking and/or bypassing) of the medium during supercritical extraction. The liquid seal phenomenon results in poor extraction. Chinese Patent No. CN1448383A, US Patent Publication No. US20050266132A1, and US Patent Publication No. US20080146851A1 disclose technologies all concerning extraction performed on dry algae. As for extraction performed on wet algae, reference can be made to the paper about extraction performed on pythium irregulare with supercritical carbon dioxide by Walker et al. The paper suggests that when the moisture content of a substance for extraction is 10 wt % (weight percentage), the extraction yield is 60%, and when the moisture content of the substance for extraction is 30 wt %, the extraction yield is decreased to 32%. The result indicates that, the supercritical extraction is difficult to be applied to the extraction of wet algae.

SUMMARY

Accordingly, the present disclosure is a high-pressure extraction apparatus, which can perform extraction on a substance at continuous mode.

According to an embodiment of the present disclosure, the high-pressure extraction apparatus comprises an extraction tank, a piston, and a control unit. The extraction tank comprises a receiving chamber, a feeding port, a first inlet, a second inlet, a recycling port, and a discharging port. The piston is disposed in the receiving chamber, and separates the receiving chamber into an extraction space and a first space. The feeding port, the first inlet, and the discharging port are disposed in the extraction space. The second inlet and the recycling port are disposed in the first space. The control unit 30 sequentially controls a substance for extraction to enter the extraction space through the feeding port; controls a medium to enter the extraction space through the first inlet till the medium reaches a supercritical point, so as to perform extraction on the substance for extraction in the extraction space to obtain an extract and an extraction residue, and discharges the medium in the first space through the recycling port; controls the medium and the extract in the extraction space to be discharged through the first inlet; and controls the medium to enter the first space through the second inlet, so that the piston compresses the extraction space, so as to discharge the extraction residue through the discharging port.

According to an embodiment, the high-pressure extraction apparatus further comprises a guide cone. The guide cone is disposed on the surface of the piston facing the extraction space. The guide cone comprises a scraper portion, and at least a part of the scraper portion contacts an inner wall of the extraction tank.

According to an embodiment, the high-pressure extraction apparatus further comprises an extract separation unit, a medium storage tank for storing the medium, a supply device, an substance storage tank for storing the substance for extraction, a first valve, a second valve, a third valve, a fourth valve, a fifth valve, and a sixth valve. When the supply device is actuated by the control unit, the supply device gets the medium from the medium storage tank, and provides the medium of a preset pressure. The first valve selectively makes the substance storage tank and the feeding port communicated or not communicated. The second valve selectively makes the supply device and the first inlet communicated or not communicated. The third valve selectively makes the medium storage tank and the recycling port communicated or not communicated. The fourth valve selectively makes the extract separation unit and the first inlet communicated or not communicated. The fifth valve selectively makes the supply device and the second inlet communicated or not communicated. The sixth valve selectively opens the discharging port.

The control unit controls the first valve to communicate the substance storage tank with the feeding port, so that the substance for extraction enters the extraction space. The control unit actuates the supply device, enables the second valve to communicate the supply device with the first inlet, enables the third valve to communicate the medium storage tank with the recycling port, so as to perform extraction on the substance for extraction in the extraction space, and discharge the medium in the first space to the medium storage tank through the recycling port. The control unit controls the fourth valve to communicate the extract separation unit with the first inlet, and controls the fifth valve to communicate the supply device with the second inlet, so as to discharge the medium and the extract in the extraction space to the extract separation unit through the first inlet. The control unit controls the fourth valve to close the communication between the extract separation unit and the first inlet, controls the fifth valve to communicate the supply device with the second inlet, and controls the sixth valve to open the discharging port, so as to enable the medium to enter the first space through the second inlet, so that the piston discharges the extraction residue through the discharging port.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The detailed features and advantages of the present disclosure are described below in great detail through the following embodiments, the content of the detailed description is sufficient for those of ordinary skill in the art of the present disclosure to understand the technical content of the present disclosure and to implement the present disclosure there accordingly. Based upon the content of the specification, the claims, and the drawings, those of ordinary skill in the art can easily understand the relevant objectives and advantages of the present disclosure. In the following description, for purpose of explanation, numerous specific details are set forth in order to provide a thorough understanding of the detailed embodiments. It will be apparent, however, that one or more embodiments may be practiced without these specific details. In other instances, well-known structures and elements are schematically shown in order to simplify the drawings.

Figure 1:
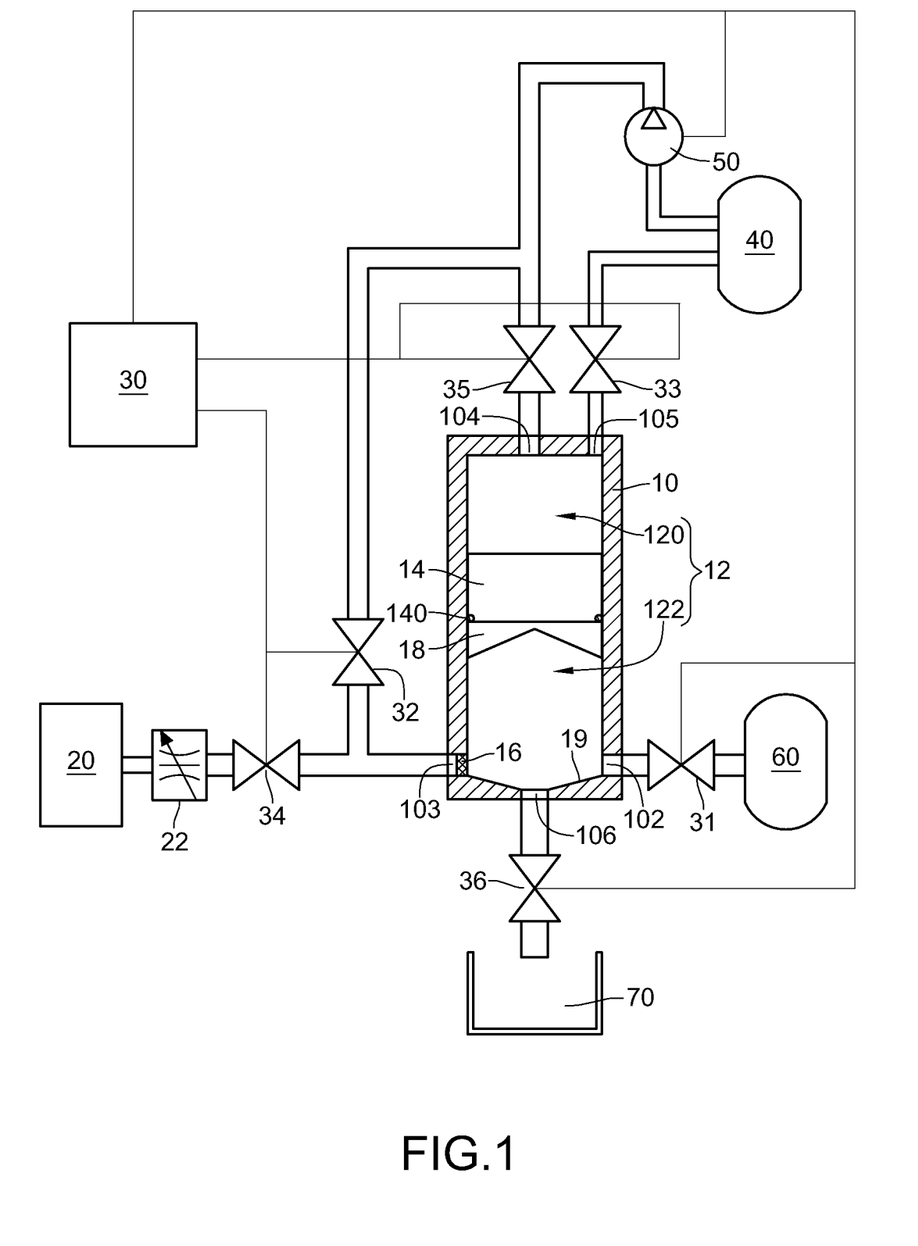
FIG. 1 is a schematic structural view of a high-pressure extraction apparatus according to an embodiment of the present disclosure.

FIG. 1 is a schematic structural view of a high-pressure extraction apparatus according to an embodiment of the present disclosure. The high-pressure extraction apparatus is suitable to use a medium (or called as extraction agent) to perform extraction on a substance for extraction (or called as substance-to-be-extracted). Application fields of the high-pressure extraction apparatus maybe, but not limited to, supercritical sesame extraction, supercritical rice cleaning, extracting peanut oil from nutshells, extracting apple flavors from apples, and extracting mint flavors from mint.

The medium and the substance for extraction may vary according to different application fields. For example, when applied to sesame extraction, the medium may be $CO_2$, and the substance for extraction is sesame. When applied to algae extraction, the medium may be $CO_2$, and the substance for extraction is dry algae or wet algae. Although the media in the examples are both $CO_2$, the present disclosure is not limited thereto, and the media may also be alkanes such as propane, butane, and trifluoromethane, alcohols such as methanol, inert gases such as xenon, nitrous oxide, sulfur hexafluoride, ammonia and water.

As shown in FIG. 1, the high-pressure extraction apparatus comprises an extraction tank 10, a piston 14, and a control unit 30. The extraction tank 10 comprises a receiving chamber 12, a feeding port 102, a first inlet 103, a second inlet 104, a recycling port 105, and a discharging port 106. The receiving chamber of the extraction tank 10 may have a shape of round cylinder, square cylinder, or other shapes.

The piston 14 is disposed in the receiving chamber 12, and separates the receiving chamber 12 into an extraction space 122 and a first space 120. When the piston 14 moves towards the top of the figure, the piston 14 compresses the first space 120 and increases the extraction space 122. On the contrary, when the piston 14 moves towards the bottom of the figure, the piston 14 compresses the extraction space 122 and increases the first space 120.

As shown in FIG. 1, the feeding port 102, the first inlet 103, and the discharging port 106 are disposed in the extraction space 122 so as to communicate with the extraction space 122. The second inlet 104 and the recycling port 105 are disposed in the first space 120 so as to communicate with the first space 120.

Figure 7:
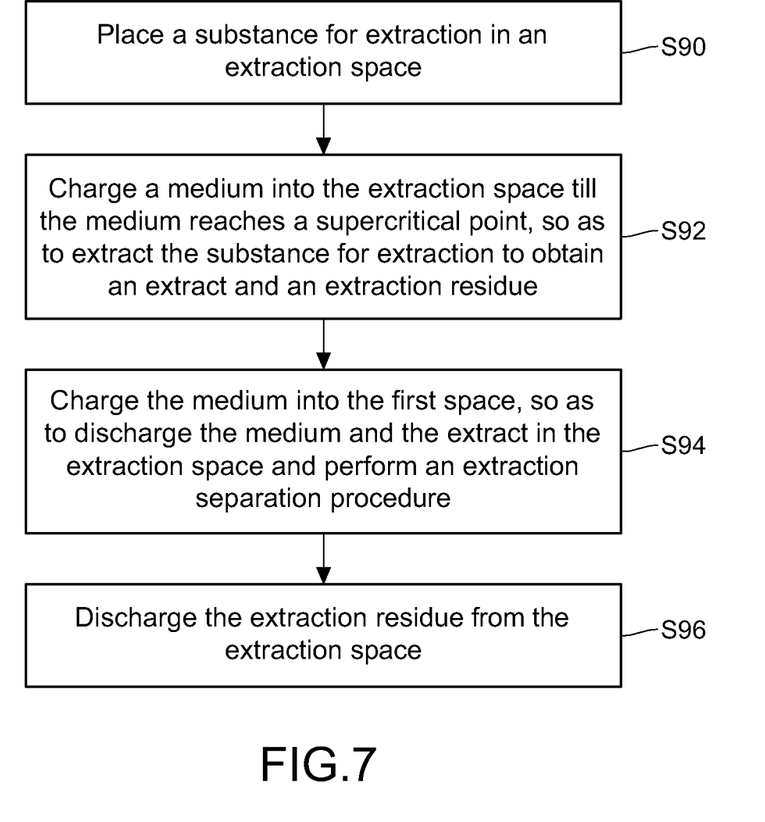
FIG. 7 is a schematic flow chart of a high-pressure extraction method according to an embodiment of the present disclosure.

The control unit 30 is used for controlling an extraction procedure of the extraction apparatus, and sequentially performs the following steps (or procedures). (Referring to FIG. 7 together, it is a schematic flow chart of a high-pressure extraction method according to an embodiment of the present disclosure.)

Figure 2A:
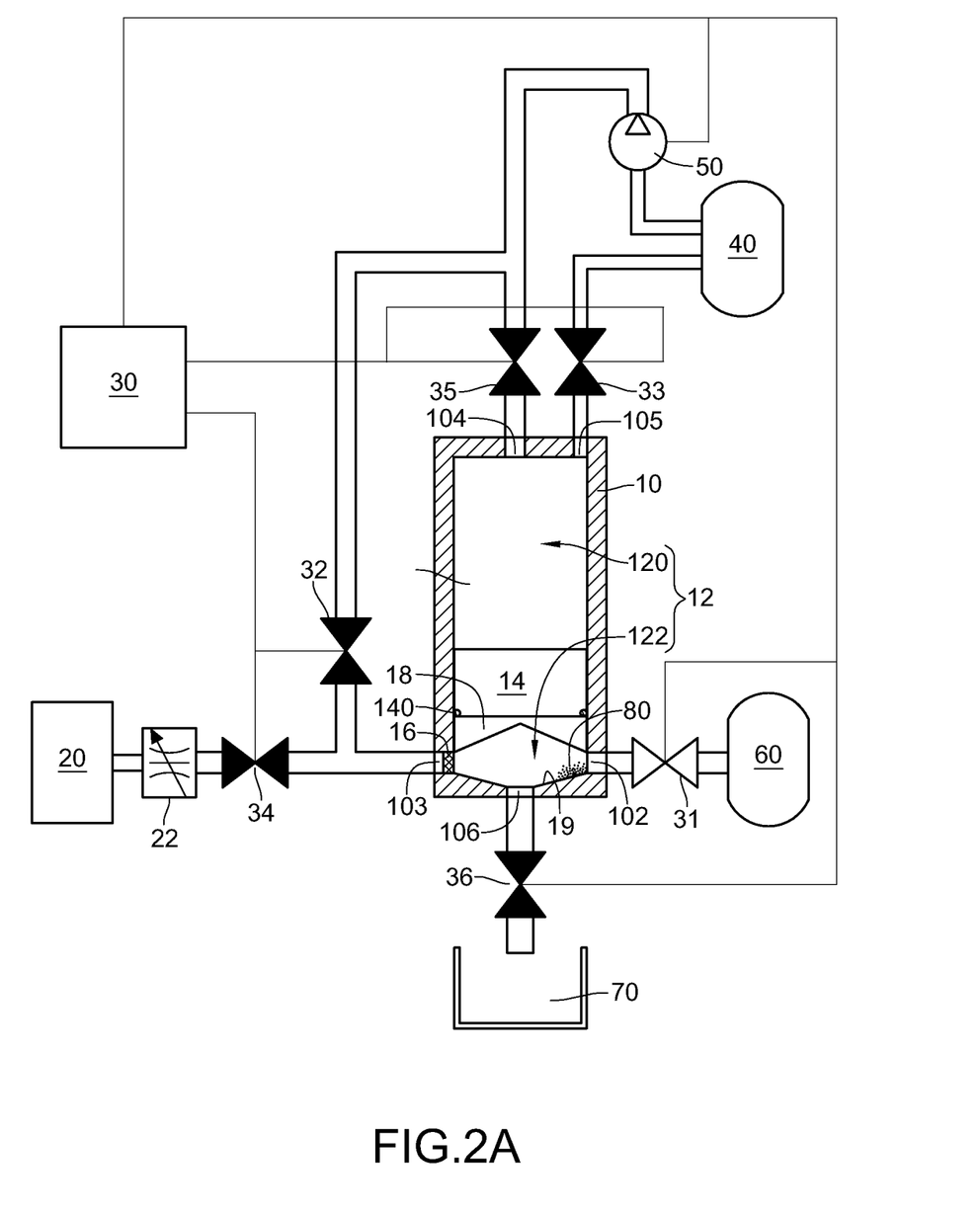
FIG. 2A, FIG. 2B, FIG. 2C, and FIG. 2D are schematic views illustrating action of a high-pressure extraction apparatus according to an embodiment of the present disclosure.

In Step S90, a substance for extraction 80 is placed (or fed) in the extraction space 122 (as shown in FIG. 2A).

Figure 2B:
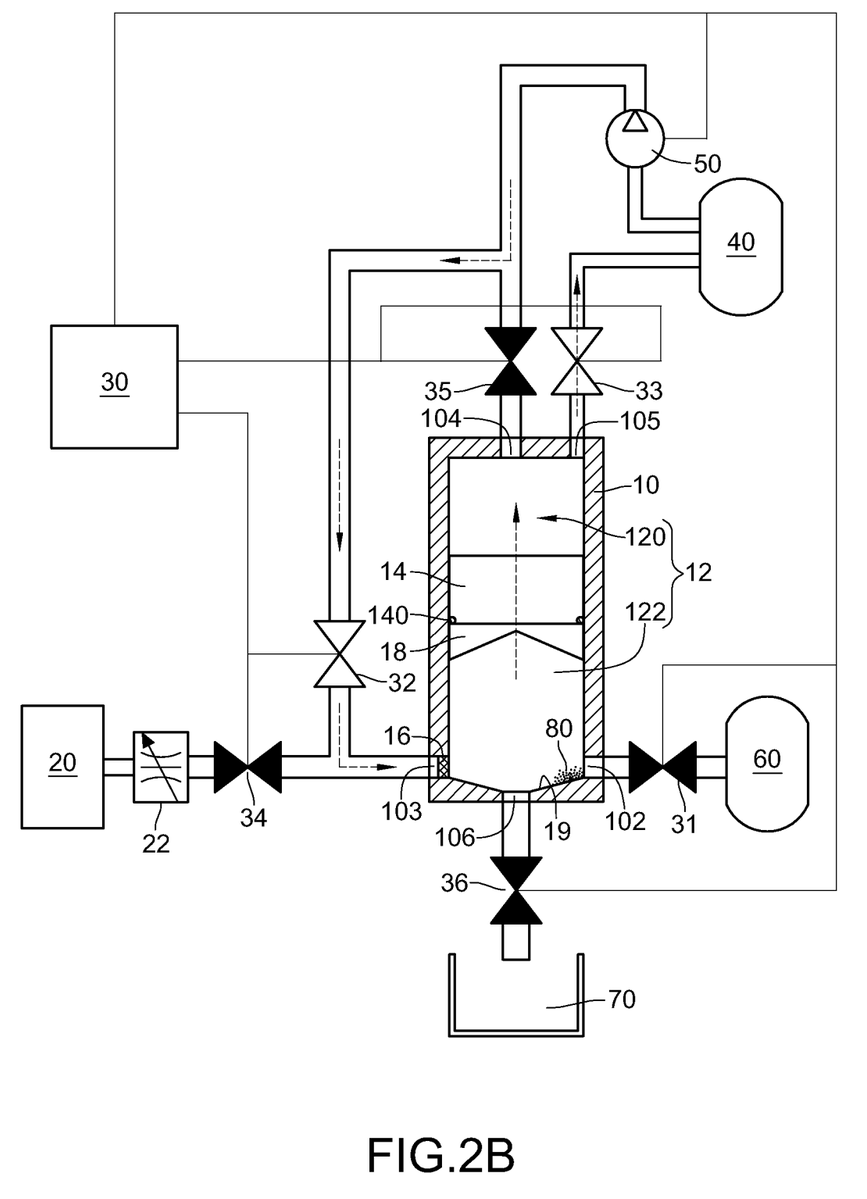
Figure 2C:
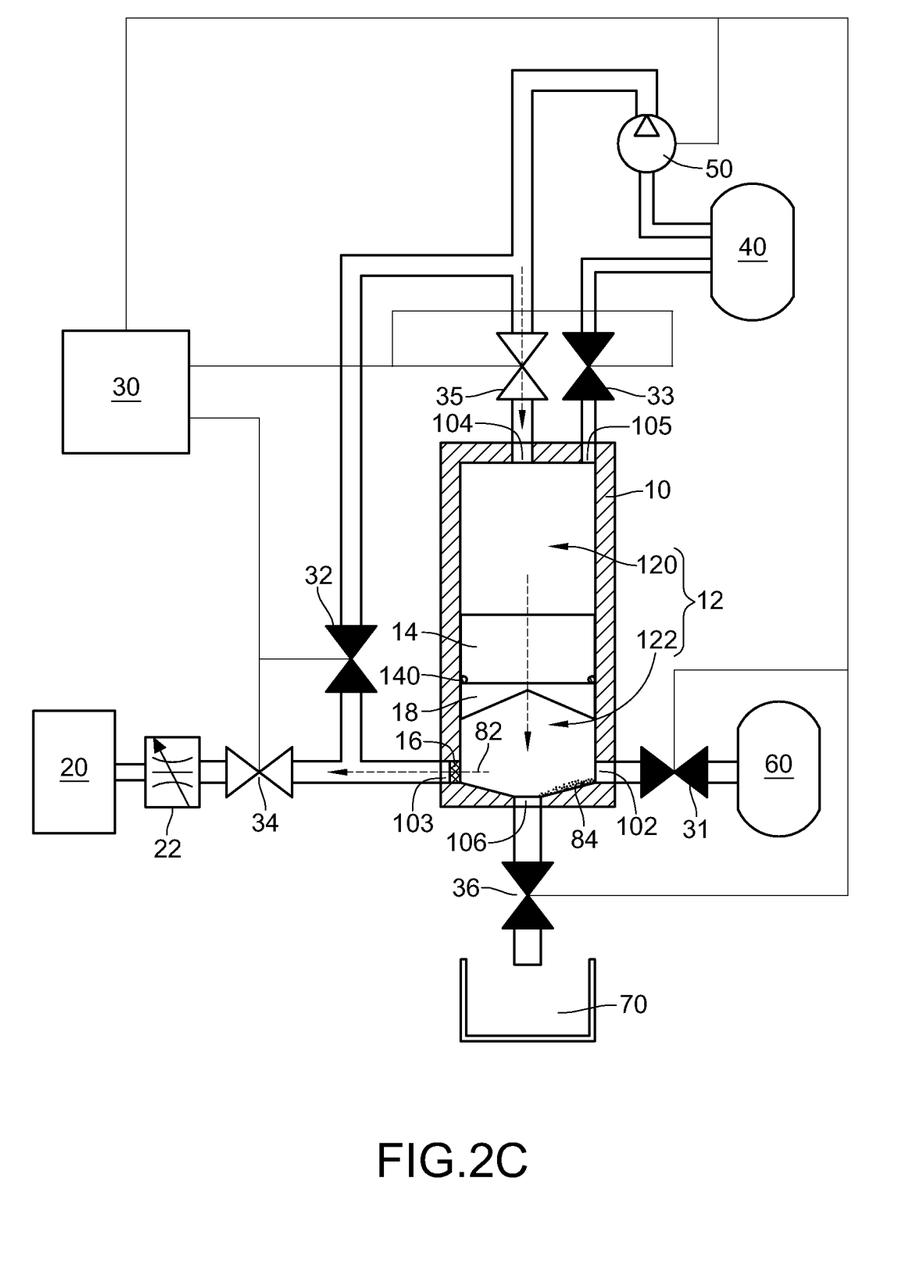
Figure 2D:
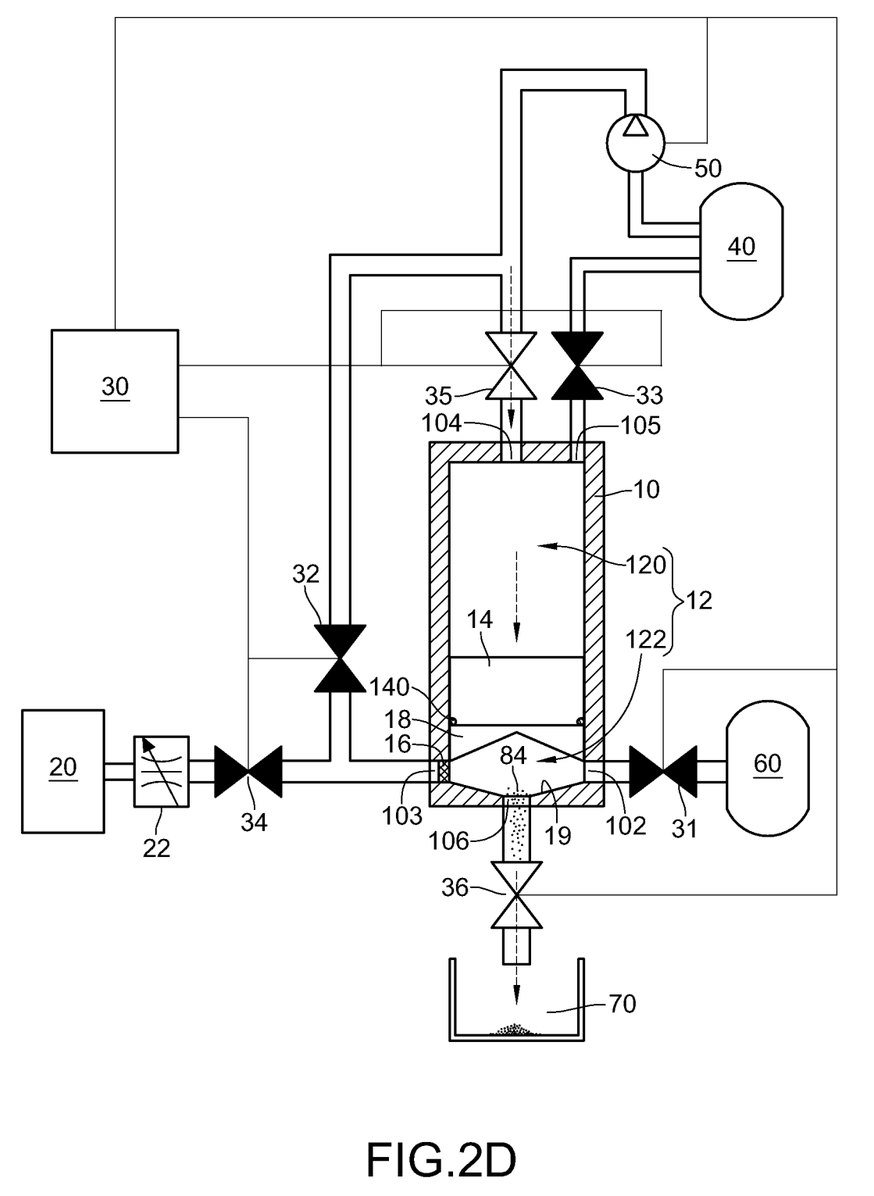

In Step S92, a medium is inputted (or charged, fed or filled) into the extraction space 122 till the medium reaches a supercritical point (as shown in FIG. 2B), so as to perform extraction on the substance for extraction to obtain an extract 82 and an extraction residue (or called as leftover) 84 (as shown in FIG. 2C and FIG. 2D).

In Step S94, the medium is inputted into the first space 120, so as to discharge the medium and the extract 82 in the extraction space 122 and perform an extraction separation procedure (as shown in FIG. 2C).

In Step S96, the extraction residue 84 is discharged from the extraction space 122 (as shown in FIG. 2D).

In Step S90, the control unit 30 controls the substance for extraction 80 to enter the extraction space 122 through the feeding port 102, as shown in FIG. 2A.

In Step S92, the control unit 30 controls the medium to enter the extraction space 122 through the first inlet 103 till the medium reaches the supercritical point, so as to extract the substance for extraction 80 in the extraction space 122, thereby obtaining the extract 82 and the extraction residue 84. In this case, the medium enters the extraction space 122, so that the piston 14 moves towards the top of FIG. 2B to compress the first space 120, and the control unit 30 synchronously discharges the medium in the first space 120 through the recycling port 105 (details are described later).

The supercritical point refers to a condition in which the medium reaches supercritical state at a specific temperature and a specific pressure. For example, when the medium is $CO_2$, $CO_2$ reaches a supercritical state at temperature greater than or equal to 31.5° C. and pressure greater than or equal to 1,072 pounds per square inch (psi). Therefore, when the control unit 30 controls the medium to enter the extraction space 122 through the first inlet 103 till the medium reaches the supercritical point may mean that the control unit 30 enables the medium to reach a preset pressure (for example aforementioned 1072 psi, in addition, the extraction can be performed at the pressure greater than 14.7 psi, so that the preset pressure is not limited to be 1072 psi and the medium is not limited to be supercritical point or state as well).

In Step S94, the control unit 30 controls the medium and the extract 82 in the extraction space 122 to be discharged through the first inlet 103.

In Step S96, the control unit 30 controls the medium to enter the first space 120 through the second inlet 104, so that the piston 14 compresses the extraction space 122, so as to discharge the extraction residue 84 through the discharging port 106.

From Step S90 to S96, the control unit 30 completes a single batch of extraction operation. The extraction operation comprises procedures such as feeding (the substance for extraction 80 enters the extraction space 122), extraction, collection of the extract 82 (details are described later), and residue discharging (the extraction residue 84 is discharged). Accordingly, after Step S96 is completed, the control unit 30 can directly return to Step S90 to re-perform a next batch of extraction operation. The next batch of extraction operation is performed without shutting down, opening the extraction tank, and removing the extraction residue in advance, thereby achieving an obvious improvement compared with the prior art.

In addition, in Step S94, the medium in the first space 120 is discharged through the recycling port 105. Although the medium discharged through the recycling port 105 is directly delivered to a medium storage tank 40 in the present disclosure, the present disclosure is not limited thereto. In the implementation, the medium discharged through the recycling port 105 may also be directly discharged to the atmosphere (if the medium is a harmless substance, for example $CO_2$).

Figure 8:
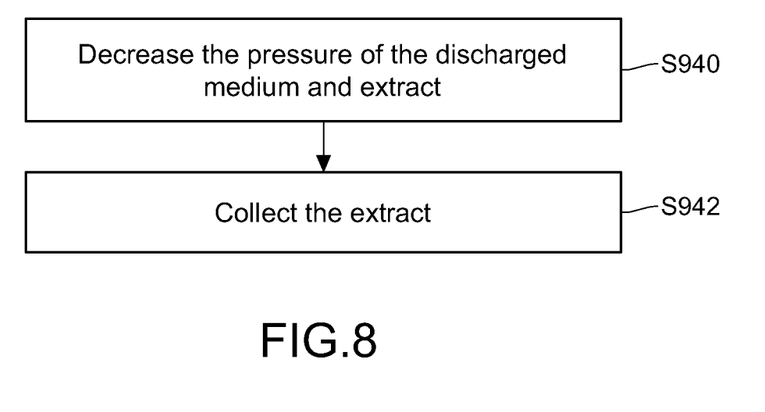
FIG. 8 is a schematic flow chart of an extraction separation procedure of the high-pressure extraction method of the present disclosure.

As for the extraction separation procedure in Step S94, refer can be made to FIG. 8. FIG. 8 is a schematic flow chart of an extraction separation procedure of a high-pressure extraction method of the present disclosure. The extraction separation procedure comprises the following steps.

In Step S940, the pressure of the discharged medium and extract 82 is decreased.

In Step S942, the extract 82 is collected.

The extract 82 in Step S940 is discharged with the high pressure medium, and in this case, after the high pressure medium is depressurized, the medium (of low pressure) and the extract 82 are separated automatically, and the extract 82 is collected in Step S942.

Discharging the extraction residue 84 from the extraction space 122 in Step S96 refers to that at least a part of the extraction residue 84 is discharged, but not all the extraction residue 84 is discharged.

As for the actions executed by the control unit 30 and the relevant structure, reference can be made to FIG. 1.

The high-pressure extraction apparatus may further comprise an extract separation unit 20, the medium storage tank 40 for storing the medium, a supply device 50, an substance storage tank 60, a first valve 31, a second valve 32, a third valve 33, a fourth valve 34, a fifth valve 35, and a sixth valve 36.

When the supply device 50 is actuated by the control unit 30, the supply device 50 gets (or called as but not limited to "pumps") the medium from the medium storage tank 40, and provides the medium having the preset pressure. The supply device 50 may be, but is not limited to, a pumping apparatus.

The substance storage tank 60 is used for storing the substance for extraction 80. The first valve 31 selectively makes the substance storage tank 60 and the feeding port 102 communicated or not communicated. The second valve 32 selectively makes the supply device 50 and the first inlet 103 communicated or not communicated. The third valve 33 selectively makes the medium storage tank 40 and the recycling port 105 communicated or not communicated. The fourth valve 34 selectively makes the extract separation unit 20 and the first inlet 103 communicated or not communicated. The fifth valve 35 selectively makes the supply device 50 and the second inlet 104 communicated or not communicated. The sixth valve 36 selectively opens or closes the discharging port 106.

The first valve 31, the second valve 32, the third valve 33, the fourth valve 34, the fifth valve 35, and the sixth valve 36 may be, but are not limited to, solenoid valves or pneumatic valves. After being actuated (or controlled), the first valve 31, the second valve 32, the third valve 33, the fourth valve 34, the fifth valve 35, and the sixth valve 36 can selectively communicate an inlet with an outlet of a valve body or close the communication of an inlet with an outlet of a valve body. Taking the first valve 31 as an example, after the first valve 31 is actuated, according to an actuating signal, the first valve 31 may communicate the substance storage tank 60 with the feeding port 102 (that is, connect the substance storage tank 60 with the feeding port 102), or close the communication of the substance storage tank 60 with the feeding port 102 (that is, in a disconnection state). The other valve 32, 33, 34, 35 are of the same. The sixth valve 36 selectively opens or closes the discharging port 106 according to an actuating signal.

In FIG. 2A, FIG. 2B, FIG. 2C, and FIG. 2D, a solid valve (blackened) illustrates that the valve is in a closed state, that is, an inlet of the valve is not communicated with an outlet of the valve. A hollow valve (only with a body frame outlined) illustrates that the valve is in an opening state, that is, an inlet of the valve and an outlet of the valve are in a communication state. The control unit 30 controls the first valve 31, the second valve 32, the third valve 33, the fourth valve 34, the fifth valve 35, and the sixth valve 36 respectively to perform continuous extraction operation.

In Step S90, the control unit 30 controls the first valve 31 to communicate the substance storage tank 60 with the feeding port 102, so that the substance for extraction 80 enters the extraction space 122. Meanwhile, the second valve 32, the third valve 33, the fourth valve 34, the fifth valve 35, and the sixth valve 36 are in a closed state. Definitely, in order to allow the substance for extraction 80 enter the extraction space 122 smoothly, in the implementation, a feeding component may be disposed between the feeding port 102 and the substance storage tank 60, so as to feed the substance for extraction into the extraction space 122.

In addition, in Step S92, the control unit 30 may first close the first valve 31, and then actuate the supply device 50, open the second valve 32 to communicate the supply device 50 with the first inlet 103, and open the third valve 33 to communicate the medium storage tank 40 with the recycling port 105, so as to charge the medium into the extraction space 122 through the first inlet 103. When the medium enters the extraction space 122 and reaches the supercritical point, the medium can extract the substance for extraction 80 in the extraction space 122 and produce the extract 82 and the extraction residue 84. Additionally, as the third valve 33 is also in an opened state, the medium in the first space 120 can be discharged to the medium storage tank 40 through the recycling port 105, thereby achieving the objective of medium-recycling.

Furthermore, as shown in FIG. 2C, in Step S94, the control unit 30 may first close the second valve 32 and the third valve 33, control the fourth valve 34 to communicate the extract separation unit 20 with the first inlet 103, and control the fifth valve 35 to communicate the supply device 50 with the second inlet 104, so that the medium and the extract 82 in the extraction space 122 are discharged to the extract separation unit 20 through the first inlet 103. In the procedure, in order to make the extraction separation procedure smooth, a throttle (or called as throttling valve) 22 may be disposed between the extract separation unit 20 and the fourth valve 34. By controlling the opening degree of the throttle 22, the flow is limited and the high pressure medium is not released instantaneously, and the piston is prevented from impacting the bottom of the extraction tank 10 quickly.

When the medium and the extract 82 reach the extract separation unit 20, due to the decrease of the pressure of the medium, the extract 82 is automatically separated from the medium, and then is collected by the extract separation unit 20.

Then, referring to FIG. 2D, in Step S96, the control unit 30 controls the fourth valve 34 to close the communication between the extract separation unit 20 and the first inlet 103, controls the fifth valve 35 to communicate the supply device 50 with the second inlet 104, and controls the sixth valve 36 to open the discharging port 106, so that the medium enters the first space 120 through the second inlet 104, and the piston 14 compresses the extraction space 122. Consequently, the extraction residue 84 is discharged through the discharging port 106. In addition, the control unit 30 may, but not limit to, control the second valve 32 to open the communication between the supply device 50 with the first inlet 103 to enhance the discharge of the extraction residue 84 through the discharging port 106 for the more sticking extraction residue 84.

In order to enable the high-pressure extraction apparatus of the present disclosure to collect the extraction residue 84, the high-pressure extraction apparatus may further comprise a residue tank 70, and the residue tank 70 may be disposed outside the discharging port 106 and is used for receiving the extraction residue 84 discharged from the discharging port 106.

Both in Step S94 and Step S96, the control unit 30 controls the fifth valve 35 to open, so that the high pressure medium enters the first space 120 through the second inlet 104, and the piston 14 moves towards in a direction for compressing the extraction space 122. As for the switching time of the two steps, it is recommended that before the piston 14 reaches the bottom of the extraction tank 10 during downward movement of the piston 14, the control unit 30 closes the fourth valve 34, and then Step S96 is performed. Accordingly, the piston 14 has a remaining stroke to push the extraction residue 84 out of the discharging port 106. However, the switching time is not limited to the aforementioned mode. In the implementation of the present disclosure, the piston 14 may also move downwards to the bottom of the extraction tank 10, and during this period of time, the medium in the extraction space 122 is still in a high pressure state (due to the throttle 22 in a discharge path of the medium, the pressure in the extraction space 122 is maintained to be close to a supercritical pressure of the medium), so that when the discharging port 106 is opened, the extraction residue 84 is discharged together with the high pressure medium, thereby achieving the discharging effect.

After Steps S90 to S96 are completed, the control unit 30 can re-close the sixth valve 36 and the fifth valve 35, and then Step S90 is re-performed for a next batch of extraction. At the beginning of the next batch of extraction, because the piston 14 has reached the bottom of the extraction tank 10, and the pressure in the extraction space 122 is released in Step S96 of the previous batch, the substance for extraction 80 can enter the extraction space 122 smoothly.

Then, when the second valve 32 is opened in Step S92, as the piston 14 is still at the bottom of the extraction tank 10, the extraction space 122 is in a state of minimum volume, and the high pressure medium from the supply device 50 has a minimum pressure loss. In other words, the least time is required to make the extraction space 122 reach the supercritical point of the medium, and compared with the prior art in which the pressure is accumulated after the whole cavity is cleared and fully filled, the extraction apparatus of the present disclosure has higher efficiency.

As described above, as for a conventional extraction tank, as considerable time needs to be spent for compensating for a pressure loss, a large-volume extraction tank is often adopted. Compared with the conventional extraction tank, in the implementation of the present disclosure, based on the aforementioned characteristic of low pressure loss, the extraction is performed in small batches, that is, in order to reduce the quantity of the substance for extraction 80 in each batch, the extraction space 122 may be suitably adjusted, and the extraction yield is taken as a main consideration concerning the ratio of the extraction space 122 to the substance for extraction 80.

In addition, referring to FIG. 1 again, other embodiments of the high-pressure extraction apparatus according to the present disclosure may further comprise a filter 16. The filter 16 is disposed at the first inlet 103 and is used for filtering the substance passing through the first inlet 103 in Step S94. The filter 16 is to keep the extraction residue 84 in the extraction space 122. The filter 16 may be, but is not limited to, a metal filter or a metal mesh. The sieve size of the filter 16 may be smaller than the particle size of the extraction residue 84.

Furthermore, the high-pressure extraction apparatus may further comprise a sealing element 140. The sealing element 140 is disposed between the piston 14 and the extraction tank 10, so as to separate the extraction space 122 from the first space 120. In other words, due to existence of the sealing element 140, an air-tight state is formed between the piston 14 and the extraction tank 10. The sealing element 140 may be, but is not limited to, an O-shaped ring or a piston ring.

In Step S96, the extraction residue 84 is discharged from the extraction space, and theoretically, it is intended to discharge the extraction residue 84 as much as possible, but in the implementation, the discharge ratio of the extraction residue 84 is limited by the process. In the following, the method according to the present disclosure can increase the discharge ratio of the extraction residue 84.

Figure 3:
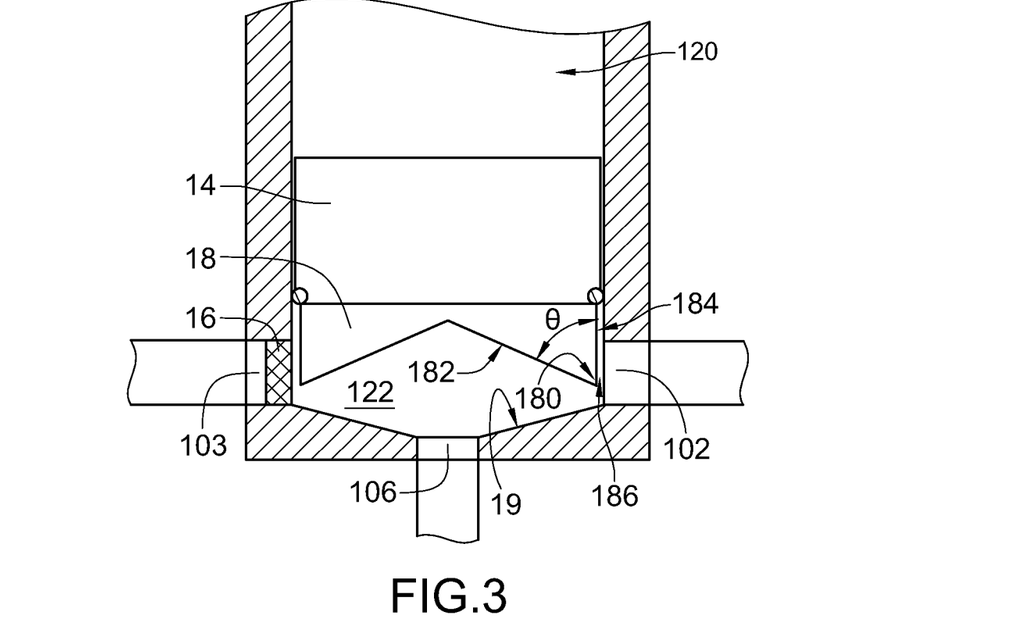
FIG. 3 is a schematic partially enlarged view of FIG. 1.

FIG. 3 is a schematic partially enlarged view of FIG. 1. Referring to FIG. 3, the high-pressure extraction apparatus may further comprise a guide cone 18. The guide cone 18 is disposed on a surface of the piston 14 facing the extraction space 122. The guide cone 18 comprises a scraper portion 180. At least a part of the scraper portion 180 contacts an inner wall of the extraction tank 10. That is to say, when the piston 14 moves up and down in the extraction tank 10, the scraper portion 180 contacts the inner wall and scrapes a substance, for example, the extraction residue 84, on the inner wall contacting the scraper portion 180. The guide cone 18 is in the shape of a recessed cone, and may be, but is not limited to, in the shape of a round cone, a triangular cone, or shapes of other geometric cones.

The scraper portion 180 comprises a scraping slope 182 (or referred to as an inner cone surface) and an outer wall surface 184. The outer wall surface 184 is substantially parallel to an inner wall surface of the extraction tank 10. An included angle between the outer wall surface 184 and the scraping slope 182 is in a range of 90° and 0°, and maybe 15°. Therefore, when the S96 is performed, the guide cone 18 can scrape the extraction residue 84 on the inner wall for discharging the extraction residue 84 from the discharging port 106.

In addition, the bottom (that is, a lower part in FIG. 3) of the extraction tank 10 may have a material-guiding slope 19. The material-guiding slope 19 is disposed between the feeding port 102 and the discharging port 106. Hence, when the control unit 30 performs Step S96, the extraction residue 84 scraped down by the guide cone 18 or the extraction residue 84 at the bottom of the extraction tank 10 can be discharged through the discharging port 106 more smoothly under the guide of the material-guiding slope 19.

In order to enable the substance for extraction 80 to enter the extraction space 122 smoothly, the high-pressure extraction apparatus may comprise a material-guiding channel 186. Referring to FIG. 3, the material-guiding channel 186 may be a gap between the guide cone 18 and the extraction tank 10, that is, a gap formed by a tolerance margin between the guide cone 18 and the inner wall surface of the extraction tank 10 or by a small difference between sizes of the guide cone 18 and the inner wall surface of the extraction tank 10 in design. When the guide cone 18 arrives at the bottom of the extraction tank 10, the material-guiding channel 186 may communicate the feeding port 102 with the extraction space 122, or communicate the extraction space 122 with the first inlet 103. Therefore, when the control unit 30 performs Step S90 and Step S94, the substance for extraction 80 or the extract 82 can pass smoothly respectively.

Figure 4:
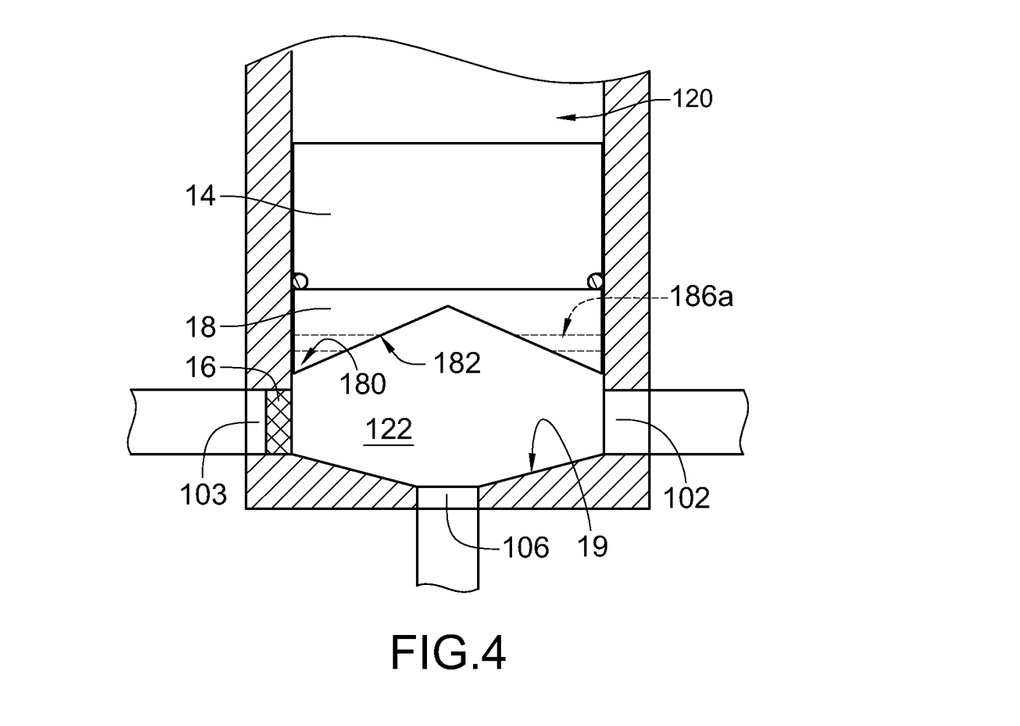
FIG. 4 is a schematic structural view of a guide cone according to a second embodiment of the present disclosure.

FIG. 4 is a schematic structural view of the guide cone 18 according to a second embodiment of the present disclosure. Referring to FIG. 4, in this embodiment, a material-guiding channel 186a is a through hole that runs through the guide cone 18 and communicating with the extraction space 122, so that the feeding of the substance for extraction 80 or the discharging of the extract 82 can be performed smoothly through the through hole (the material-guiding channel 186a).

Figure 5A:
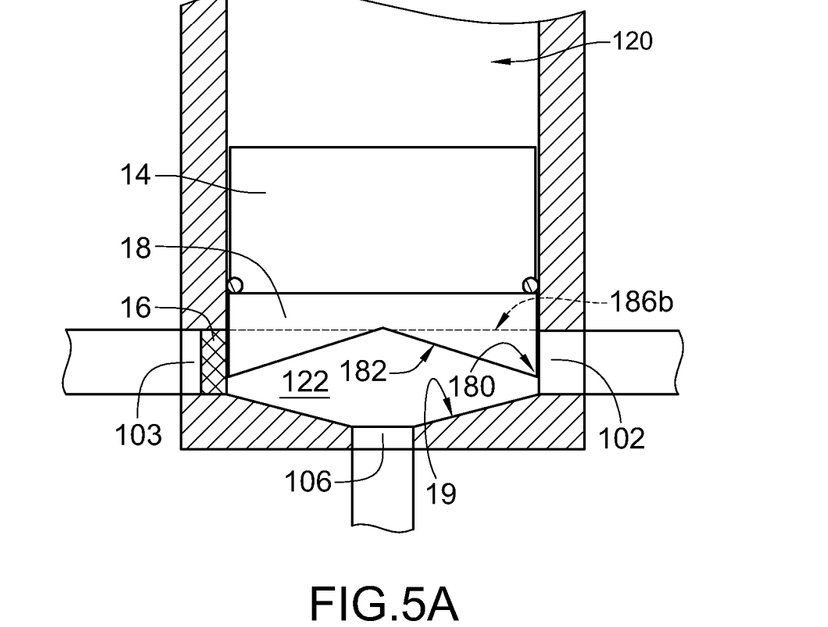
FIG. 5A and FIG. 5B are schematic structural views of a guide cone according to a third embodiment of the present disclosure.
Figure 5B:
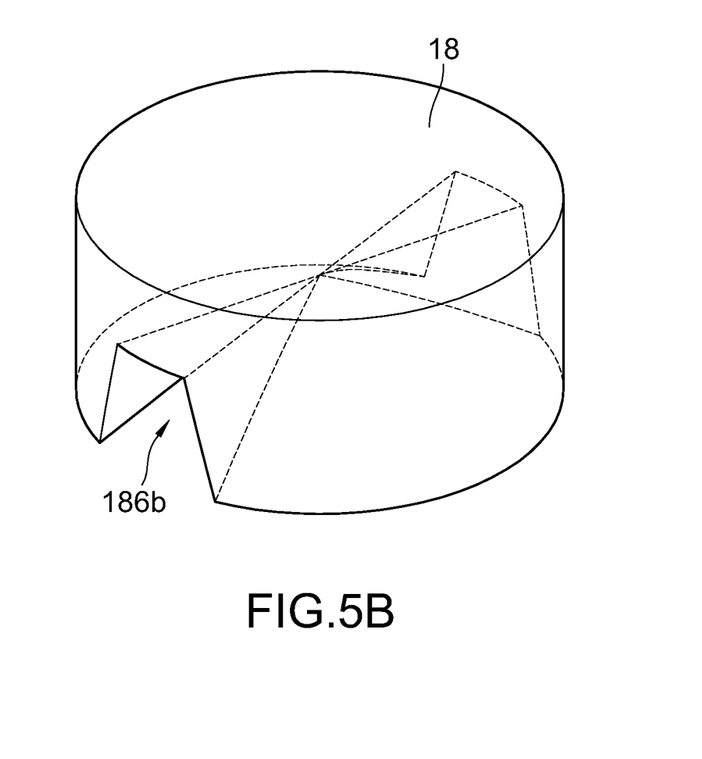

FIG. 5A and FIG. 5B are schematic structural views of the guide cone 18 according to a third embodiment of the present disclosure. Referring to FIG. 5A and FIG. 5B, in this embodiment, a material-guiding channel 186b is a channel having a cross-sectional area of opening greater than or equal to that of the feeding port 102 and the first inlet 103, respectively. It can be seen in FIG. 5B that, the material-guiding channel 186b is a rectangular groove, but the shape of the material-guiding channel 186b is not limited thereto, and may also be a semi-circular or trapezoidal groove or hole, or grooves or holes of other shapes.

Figure 6:
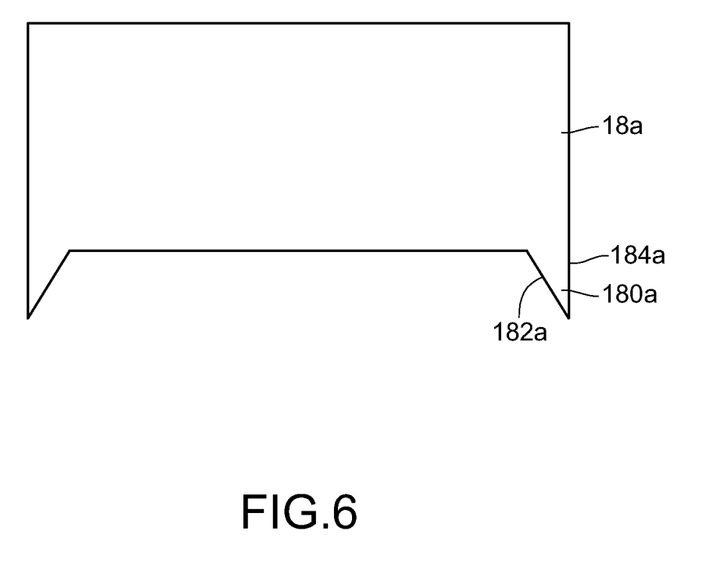
FIG. 6 is a schematic structural view of a guide cone according to a fourth embodiment of the present disclosure.

FIG. 6 is a schematic structural view of the guide cone 18 according to a fourth embodiment of the present disclosure. Referring to FIG. 6, in this embodiment, a scraper portion 180a of a guide cone 18a comprises a scraping slope 182a and an outer wall surface 184a, and an included angle between the scraping slope 182a and the outer wall surface 184a is obviously greater than the included angle in the embodiment in FIG. 1, thus also achieving the effect of scraping the extraction residue 84.

In addition, the position of the feeding port 102 and the first inlet 103 can be suitably arranged, and a distance therebetween may be 0.5 cm to 8 cm. In each batch of extraction, the volume of each batch of the substance for extraction 80 may be, but not limited to be, less than or equal to 50% of the extraction space 122 (the maximum volume, that is, when the piston 14 is at the very top of the receiving chamber 12 on FIG. 1). In a small batch of extraction, the volume of each batch of the substance for extraction 80 may be less than or equal to 10% of the extraction space 122.

Extraction Experiments

The inventors performed extraction experiments on wet algae mud with the high-pressure extraction apparatus according to the first embodiment, and made the following comparisons with the conventional extraction tank.

Experiment 1A: Nannochloropsis with a moisture content of 67.8 wt % (weight percentage) and ethanol (alcohol, ethyl alcohol) were mixed at a weight ratio of 1:1. After homogenization was performed by a high pressure homogenizer, 20 g (gram) of the mixture was taken. 48 ml of ethyl acetate and 24 ml of methanol (methyl alcohol) were added. Sonication extraction was performed at 60° C. for 3 hours. After filtration, the filtrate was concentrated, transesterified and quantitatively analyzed, to obtain 0.115 g of fatty acid methyl ester (FAME). A filter cake (in which the filter cake refers to the filter residue obtained after the extraction procedure performed on the 20 g of algae mud, that is, the algae after one-time filtration) was added into 48 ml of ethyl acetate and 24 ml of methanol, and the sonication extraction was repeated three times. The total weight of the FAME of the three-time extraction was 0.119 g.

Experiment 1B: Nannochloropsis with a moisture content of 67.8 wt % and ethanol were mixed at a weight ratio of 1:1. After homogenization was performed by a high pressure homogenizer, 10 g of the mixture was taken. 25 g of ethanol co-solvent was added into the high-pressure extraction apparatus of the present disclosure. A medium ($CO_2$) was charged for pressurization to 4,500 psi (that is, the preset pressure) and 60° C. (the pressure and the temperature are conditions of the supercritical point of $CO_2$), and maintained at the pressure for 30 minutes. Constant pressure extraction was performed (that is, Step S94 in the present disclosure), and the extraction procedure was completed within about 1 minute. An extract was transesterified and quantitatively analyzed, to obtain 0.057 g of FAME. The extraction yield was 95.7%, and the consumption of $CO_2$ was 79.4 g. The consumption of ethanol was calculated to be 18.8 g per gram of dry algae, and the consumption of $CO_2$ was calculated to be 49.6 g per gram of dry algae and 1.39 g per mg of FAME.

Experiment 1C: Nannochloropsis with a moisture content of 67.8 wt % and ethanol were mixed at a weight ratio of 1:1. After homogenization was performed by a high pressure homogenizer, 10 g of the mixture was taken. 25 g of ethanol was added for agitated extraction. After 30 minutes, suction filtration was performed, and an extract was transesterified and quantitatively analyzed, to obtain 0.034 g of FAME. The extraction yield was 58.5%. The consumption of ethanol was calculated to be 18.8 g per gram of dry algae, and the consumption of $CO_2$ was calculated to be 0 g.

Experiment 2A: Nannochloropsis with a moisture content of 80.1 wt % and ethanol were mixed at a weight ratio of 1:3. After homogenization was performed by a high pressure homogenizer, 20 g of the mixture was taken. 48 ml of n-hexane and 24 ml of methanol were added, and sonication extraction was performed at 60° C. for 3 hours. After filtration, the filtrate was concentrated, transesterified and quantitatively analyzed, to obtain 0.0995 g of FAME.

Experiment 2B: Nannochloropsis with a moisture content of 80.1 wt % and ethanol were mixed at a weight ratio of 1:3. After homogenization was performed by a high pressure homogenizer, 20 g of the mixture was taken. 15 g of ethanol co-solvent was added into a conventional vertical high-pressure extraction tank, which was pressurized to 4,500 psi and 60° C. After 30-minute dynamic extraction, the extract was transesterified and quantitatively analyzed, to obtain 0.073 g of FAME. The extraction yield was 73.4%, and the consumption of $CO_2$ was 354.5 g. The consumption of ethanol was calculated to be 30.0 g per gram of dry algae, and the consumption of $CO_2$ was calculated to be 354.5 g per gram of dry algae and 4.86 g per mg of FAME.

By comparing Experiment 1B with Experiment 2B, the following table is obtained.

| Exp. # | Substance for extraction | Ethanol co-solvent (/g algae) | Supercritical extraction 4500 psi, 60° C. (/g algae) | FAME | Extraction yield (%) | Consumption of $CO_2$ (/mg FAME) |
|---|---|---|---|---|---|---|
| 1B | 10 g | 18.8 g | 49.6 g | 0.057 g | 95.7% | 1.39 g |
| 2B | 20 g | 30 g | 354.5 g | 0.073 g | 73.4% | 4.86 g |

It can be seen from the table above that, both Experiment 1B and Experiment 2B adopt the supercritical extraction, but Experiment 1B uses the high-pressure extraction apparatus of the present disclosure, and Experiment 2B uses the conventional supercritical extraction tank. It can be seen from the results that, the extraction yield (95.7%) of the present disclosure is much higher than the extraction yield (73.4%) of the conventional apparatus. In addition, the consumption of $CO_2$ is only 1.39 g per mg of the extract FAME in the present disclosure, but as for the conventional extraction tank, the consumption of $CO_2$ is 4.86 g per mg of the extract FAME.

Experiment 3A: 10 g of nannochloropsis with a moisture content of 84.2 wt % was taken, and 48 ml of ethyl acetate and 24 ml of methanol were added. Sonication extraction was performed at 60° C. for 3 hours. After filtration, the filtrate was transesterified and quantitatively analyzed, to obtain 0.12 g of FAME. A filter cake was added into 48 ml of ethyl acetate and 24 ml of methanol, and the extraction was repeated twice. The total weight of FAME was 0.169 g.

Experiment 3B: 5 g of nannochloropsis with a moisture content of 84.2 wt % was taken, and 3 g of sulfuric acid and 32 g of methanol were added. Sonication extraction was performed at 80° C. for 2 hours, and then, the mixture was poured into a high-pressure piston extraction tank, which was pressurized to 4,500 psi and 60° C., and maintained at the pressure for 1 minute. Constant pressure extraction was performed, and the extraction procedure was completed within about 1 minute. The extract was transesterified and quantitatively analyzed, to obtain 0.061 g of FAME. The extraction yield was 72.2%, and the consumption of $CO_2$ was 67.1 g. The consumption of $CO_2$ was calculated to be 84.9 g per gram of dry algae and 1.10 g per mg of FAME.

Experiment 4A: 10 g of Pavlova salina with a moisture content of 72.8 wt % was taken, and 48 ml of n-hexane and 24 ml of methanol were added. Sonication extraction was performed for 3 hours. After filtration, the filtrate was transesterified and quantitatively analyzed, to obtain 0.441 g of FAME. The experiment was repeated. 10 g of Pavlova salina with a moisture content of 72.8 wt % was taken, and 48 ml of toluene and 24 ml of methanol were added. Sonication extraction was performed for 3 hours. After filtration, the filtrate was transesterified and quantitatively analyzed, to obtain 0.427 of FAME. The average FAME content was 0.434 g.

Experiment 4B: 10 g of Pavlova salina with a moisture content of 74.4 wt % was taken, 10 ml of 5N potassium hydroxide solution in methanol was added, and the mixture was heated at 100° C. for 60 minutes. Then, 10 ml of 7N hydrochloride solution in methanol and 10 ml of boron trifluoride solution in methanol were added, and the mixture was heated at 100° C. for 60 minutes. The mixture was poured into a vertical high-pressure extraction tank. After 9-hour continuous extraction, the extract was quantitatively analyzed, to obtain 0.231 g of FAME. The extraction yield was 53.2%, and the consumption of $CO_2$ was 6,380.6 g. The consumption of $CO_2$ was calculated to be 2,492.4 g per gram of dry algae and 27.6 g per mg of FAME.

By comparing Experiment 3B with Experiment 4B, the following table is obtained.

| Exp. # | Substance for extraction | Extraction Time (hour) | Supercritical extraction 4500 psi, 60° C. (/g algae) | FAME | Extraction yield (%) | Consumption of $CO_2$ (/mg FAME) |
|---|---|---|---|---|---|---|
| 3B | 5 g | 0.5 | 84.9 g | 0.061 g | 72.2% | 1.10 g |
| 4B | 10 g | 9 | 2492.4 g | 0.231 g | 53.2% | 27.60 g |

It can be seen from the table above that, both Experiment 3B and Experiment 4B adopt the method of performing transesterification first and then performing supercritical extraction. Experiment 3B uses the high-pressure extraction apparatus of the present disclosure, while Experiment 4B uses the conventional supercritical extraction tank. It can be seen from the results that, under different process conditions, the extraction yield (72.2%) of the present disclosure is much higher than the extraction yield (53.2%) of the conventional apparatus. In addition, the consumption of $CO_2$ is only 1.1 g per mg of the extract of FAME in the present disclosure, but as for the conventional extraction tank, the consumption of $CO_2$ is 27.6 g per mg of the extract of FAME.

Experiment 5A: A green algae powder solution in ethanol was poured into a piston extraction tank and dried by air purge, and then was placed into an oven of 60° C. and baked for 10 minutes. $CO_2$ was charged into the extraction space 122 until the pressure reaches 1,000 psi at 25° C. The fifth valve is open to communicate media supply with the first space at 1000 psi. An outlet valve was opened to discharge $CO_2$, and the residue was discharged. The weight of the discharged residue that was collected was 1.80 g, and the weight of the residue scraped from the piston extraction tank was 0.03 g. The discharge ratio was calculated to be 98.4%.

Experiment 5B: A green algae powder solution in ethanol was poured into a conventional vertical extraction tank and dried by air purge, and then was placed into an oven of 60° C. and baked for 10 minutes. $CO_2$ was charged to 1,000 psi at 25° C. An outlet valve was opened to discharge $CO_2$, and the residue was discharged. The weight of the discharged residue that was collected was 1.54 g, and the weight of the residue scraped from the piston extraction tank was 1.21 g. The discharge ratio was calculated to be 56.0%.

It can be known from Experiments 5A and 5B that, the discharge ratio (98.4%) of the high-pressure extraction apparatus of the present disclosure is much greater than the discharge ratio (56%) of the conventional high-pressure extraction tank, which shows the effect of the guide cone 18. In addition, in Experiments 5A and 5B, the extraction is performed on the dry algae, but in other experiments, the extraction is performed on the wet algae. It can be seen from the experimental results that, the extraction apparatus of the present disclosure has a high extraction yield and a high discharge ratio for both dry algae and wet algae.

In addition, according to the extraction apparatus of the present disclosure, the effect of continuous extraction can be achieved, so that extraction can be performed in small batches. Additionally, the extraction yield can be measured at the extract separation unit instantly before deciding the time of next feeding. Such a closed-loop extraction procedure can obtain a desired amount of the extract in an efficient manner without wasting the medium (for example, $CO_2$).

In the small batch of extraction, the weight of the substance for extraction of each batch at feeding may be determined according to the size of the extraction space 122 of the extraction tank 10, or the extraction times after each batch of feeding is set (that is, the extraction process is performed several times for each batch of feeding, and then discharging is performed). Through the implementation of small batch of extraction in the present disclosure, extraction may also be effectively performed on substances with a high moisture content (such as wet algae) (as described in the experiments), and the influence caused by bypassing or blocking (phenomena of liquid seal) are alleviated.

In addition, by adopting the extraction of small batches (quantities), in order to obtain a large throughput, multiple sets of the high-pressure extraction apparatus of the present disclosure can be operated in parallel.

In view of the above, the high-pressure extraction apparatus according to the present disclosure can perform continuous extraction in small batches, and can achieve a high extraction yield when performing extraction on a substance for extraction with a high moisture content. In addition, the extraction apparatus of the present disclosure can also achieve a high discharge ratio, thereby increasing the overall efficiency. Furthermore, the present disclosure adopts the constant pressure extraction; that is, when the extract 82 is discharged (Step S94), the pressure in the extraction space 122 in the extraction tank 10 will not decrease much. Even when the extraction residue 84 is discharged (Step S96), the extraction space 122 has been in a minimum volume state. Consequently, during pressurizing for a next batch, time required for reaching a pressure of a supercritical point is very short, and the time required for each batch of extraction is reduced.

What is claimed is:

1. A high-pressure extraction apparatus, comprising:
   an extraction tank, comprising a receiving chamber, a feeding port, a first inlet, a second inlet, a recycling port, and a discharging port;
   a piston, disposed in the receiving chamber and separating the receiving chamber into an extraction space and a first space, wherein the feeding port, the first inlet, and the discharging port are disposed in the extraction space, and the second inlet and the recycling port are disposed in the first space;
   a control unit, for sequentially
      controlling a substance for extraction to enter the extraction space through the feeding port;
      controlling a medium to enter the extraction space through the first inlet till the medium reaches a supercritical point, so as to perform extraction on the substance for extraction in the extraction space to obtain an extract and an extraction residue, and discharging a medium in the first space through the recycling port;
      controlling the medium and the extract in the extraction space to be discharged through the first inlet; and
      controlling the medium to enter the first space through the second inlet, so that the piston compresses the extraction space, so as to discharge the extraction residue through the discharging port;
   an extract separation unit;
   a medium storage tank, for storing the medium;
   a supply device, wherein when the supply device is actuated by the control unit, the supply device gets the medium from the medium storage tank, and provides the medium having a preset pressure;
   an substance storage tank, for storing the substance for extraction;
   a first valve, for selectively making the substance storage tank and the feeding port communicated or not communicated;
   a second valve, for selectively making the supply device and the first inlet communicated or not communicated;
   a third valve, for selectively making the medium storage tank and the recycling port communicated or not communicated;
   a fourth valve, for selectively making the extract separation unit and the first inlet communicated or not communicated;
   a fifth valve, for selectively making the supply device and the second inlet communicated or not communicated; and
   a sixth valve, for selectively opening or closing the discharging port,
   wherein
   the control unit controls the first valve to communicate the substance storage tank with the feeding port, so that the substance for extraction enters the extraction space;

the control unit actuates the supply device, enables the second valve to communicate the supply device with the first inlet, and enables the third valve to communicate the medium storage tank with the recycling port to perform extraction on the substance for extraction in the extraction space and discharge the medium in the first space to the medium storage tank through the recycling port;

the control unit controls the fourth valve to communicate the extract separation unit with the first inlet, and controls the fifth valve to communicate the supply device with the second inlet, so as to discharge the medium and the extract in the extraction space to the extract separation unit through the first inlet; and the control unit controls the fourth valve to close the communication between the extract separation unit and the first inlet, controls the fifth valve to communicate the supply device with the second inlet, and controls the sixth valve to open the discharging port, so as to enable the medium to enter the first space through the second inlet, so that the piston discharges the extraction residue through the discharging port.

2. The high-pressure extraction apparatus according to claim 1, wherein the step of the control unit controlling the medium to enter the extraction space through the first inlet till the medium reaches the supercritical point is that the control unit enables the medium to reach a preset pressure.

3. The high-pressure extraction apparatus according to claim 1, further comprising a filter, disposed at the first inlet.

4. The high-pressure extraction apparatus according to claim 1, further comprising a sealing element, disposed between the piston and the extraction tank.

5. The high-pressure extraction apparatus according to claim 1, further comprising a guide cone, disposed on a surface of the piston facing the extraction space, wherein the guide cone comprises a scraper portion, and at least a part of the scraper portion contacts an inner wall of the extraction tank.

6. The high-pressure extraction apparatus according to claim 5, wherein the scraper portion comprises a scraping slope and an outer wall surface, and an included angle between the outer wall surface and the scraping slope is in a range of 90° and 0°.

7. The high-pressure extraction apparatus according to claim 6, wherein the outer wall surface comprises a material-guiding channel adjacent to the feeding port, and the material-guiding channel enables the feeding port and the extraction space to be communicated when the piston moves to the bottom of the extraction space.

8. The high-pressure extraction apparatus according to claim 1, wherein the extraction tank further comprises a material-guiding slope, disposed between the feeding port and the discharging port.

9. The high-pressure extraction apparatus according to claim 1, further comprising a throttle, disposed between the extract separation unit and the fourth valve.

10. The high-pressure extraction apparatus according to claim 1, further comprising a residue tank, for receiving the extraction residue discharged from the discharging port.

11. The high-pressure extraction apparatus according to claim 1, wherein the supply device is a pressurizing pump.

* * * * *